(12) United States Patent
McElhany

(10) Patent No.: US 6,607,345 B2
(45) Date of Patent: Aug. 19, 2003

(54) LIFT SYSTEM FOR AN ALL TERRAIN VEHICLE

(76) Inventor: Grady L. McElhany, 7865 Highwood Cir. S., Semmes, AL (US) 36575

( * ) Notice: Subject to any disclaimer, the term of this patent is extended or adjusted under 35 U.S.C. 154(b) by 0 days.

(21) Appl. No.: 09/812,654

(22) Filed: Mar. 20, 2001

(65) Prior Publication Data

US 2001/0046431 A1 Nov. 29, 2001

Related U.S. Application Data

(60) Provisional application No. 60/191,295, filed on Mar. 21, 2000.

(51) Int. Cl.$^7$ .................................................. B60P 1/48
(52) U.S. Cl. ...................... 414/462; 414/471; 414/546; 414/703
(58) Field of Search ................................. 414/462, 471, 414/546, 607, 703, 920

(56) References Cited

U.S. PATENT DOCUMENTS

| | | | | |
|---|---|---|---|---|
| 4,806,063 A | * | 2/1989 | York ........................... | 414/462 |
| 5,163,800 A | * | 11/1992 | Raisio ......................... | 414/546 |
| 5,213,466 A | * | 5/1993 | Bubik .......................... | 414/546 |
| 5,232,329 A | * | 8/1993 | Livingston .................. | 414/462 |
| 5,590,997 A | * | 1/1997 | Fredriksson et al. ........ | 414/546 |
| 5,620,296 A | * | 4/1997 | McMahon et al. .......... | 414/462 |
| 5,662,451 A | * | 9/1997 | Muzzi et al. ................ | 414/462 |
| 5,975,831 A | * | 11/1999 | Martin ........................ | 414/462 |
| 6,138,991 A | * | 10/2000 | Myers ......................... | 414/462 |
| 6,155,771 A | * | 12/2000 | Montz ......................... | 414/462 |

* cited by examiner

*Primary Examiner*—Kathy Matecki
*Assistant Examiner*—Sang Kim

(57) ABSTRACT

The invention is a lifting device for attachment to an ATV which can utilize a small motor or crank, such as a boat crank, in order to carry a belt over a pulley system between the ATV frame and a platform to lift an object from the platform resting on the ground to the platform raised above the luggage rack platform on the rear of the ATV. The lifting platform may have a lifting plate floor which carries the load over (or on top of) the ATV rear luggage rack. The platform may be equipped with a removable or an extendable wheel so that it may function as a cart when the wheel is attached or extended.

4 Claims, 5 Drawing Sheets

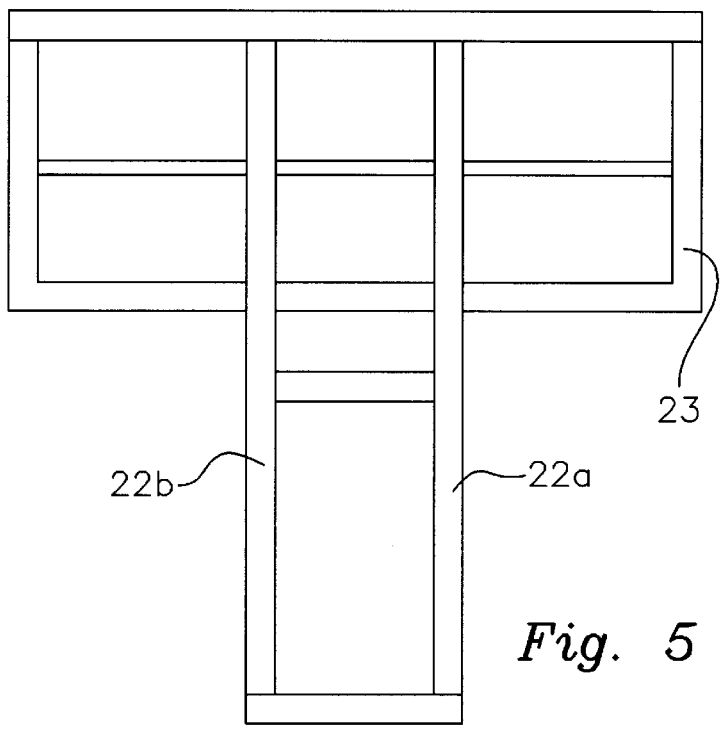
Fig. 5
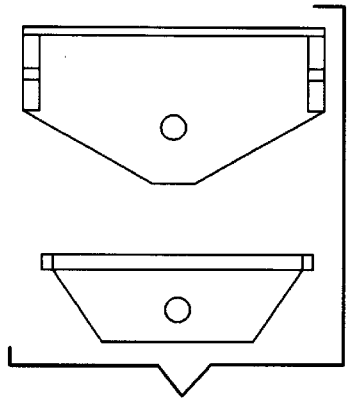
Fig. 6
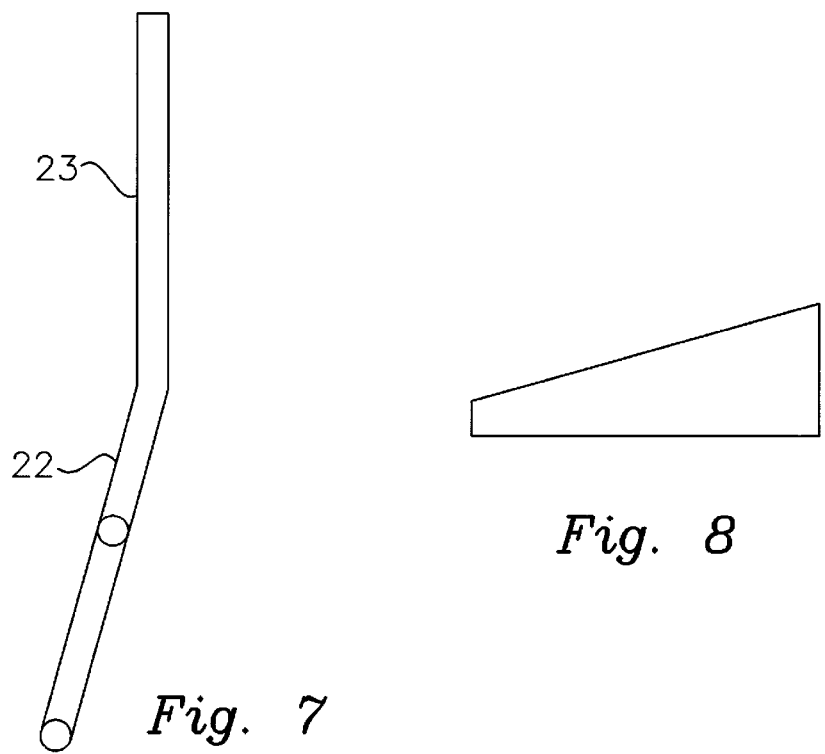
Fig. 7
Fig. 8 ial correspond to parts throughout the several views of the invention.

LIFT SYSTEM FOR AN ALL TERRAIN VEHICLE

PRIORITY

This patent is a continuation of Provisional Patent Ser. No. 60/191,295 filed Mar. 21, 2000.

BACKGROUND OF INVENTION

1. Field of Invention

The present invention relates to all terrain vehicles (ATVs) and other vehicles with trailer hitches. More particularly the present invention relates to lift systems for use with ATVs.

2. Prior Art

ATVs are well known in the prior art. Also known in the prior art are racks for ATVs and trailers for attachment to trailer hitches.

3. General Discussion of Invention

The invention is a lifting device for attachment to an ATV which can utilize a small motor or crank, such as a boat crank, in order to lift an object from a platform on the ground to a luggage rack platform on the rear of the ATV. In this way, someone can lower the platform to the ground. Thereafter the load can be placed on the platform. The platform may be flexible at the point where it attaches to the lifting mechanism so that it lies flat on the ground. Once the weight is on the device, it may be secured in place and then the crank activated to lift the platform. The angle of the platform tilts the load over the atv. When the securing means holding the load in place is removed it falls onto the ATV platform (usually the rear of the atv). The diagrams show that the lifting platform may have a lifting plate floor which carries the load over (or on top of) the atv rear luggage rack 5. A pad 35 may be used in order to cushion the lifting plate floor 24 over the luggage rack 5.

It is therefore an object of the invention to provide a lifting means which can be used on a small vehicle but which can be used to carry substantial loads from the ground to the ATV.

Further objects include means to secure the device while the load is lifted and in order to cushion the load and prevent the load from pulling the atv to the ground.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF DRAWINGS

For a further understanding of the nature and objects of the present invention, reference should be made to the following detailed description taken in conjunction with the accompanying drawings in which like parts are given like reference numerals and wherein:

FIG. 5 shows a top view of the lift arms and lift plate floor.

FIG. 6 shows a detail of a securing plate.

FIG. 7 shows a side view of FIG. 5.

FIG. 8 shows the 1 to 8 to 20 drop of the pan of FIG. 5.

DETAILED DESCRIPTION OF THE PREFERRED EXEMPLARY EMBODIMENTS

Figure 1:
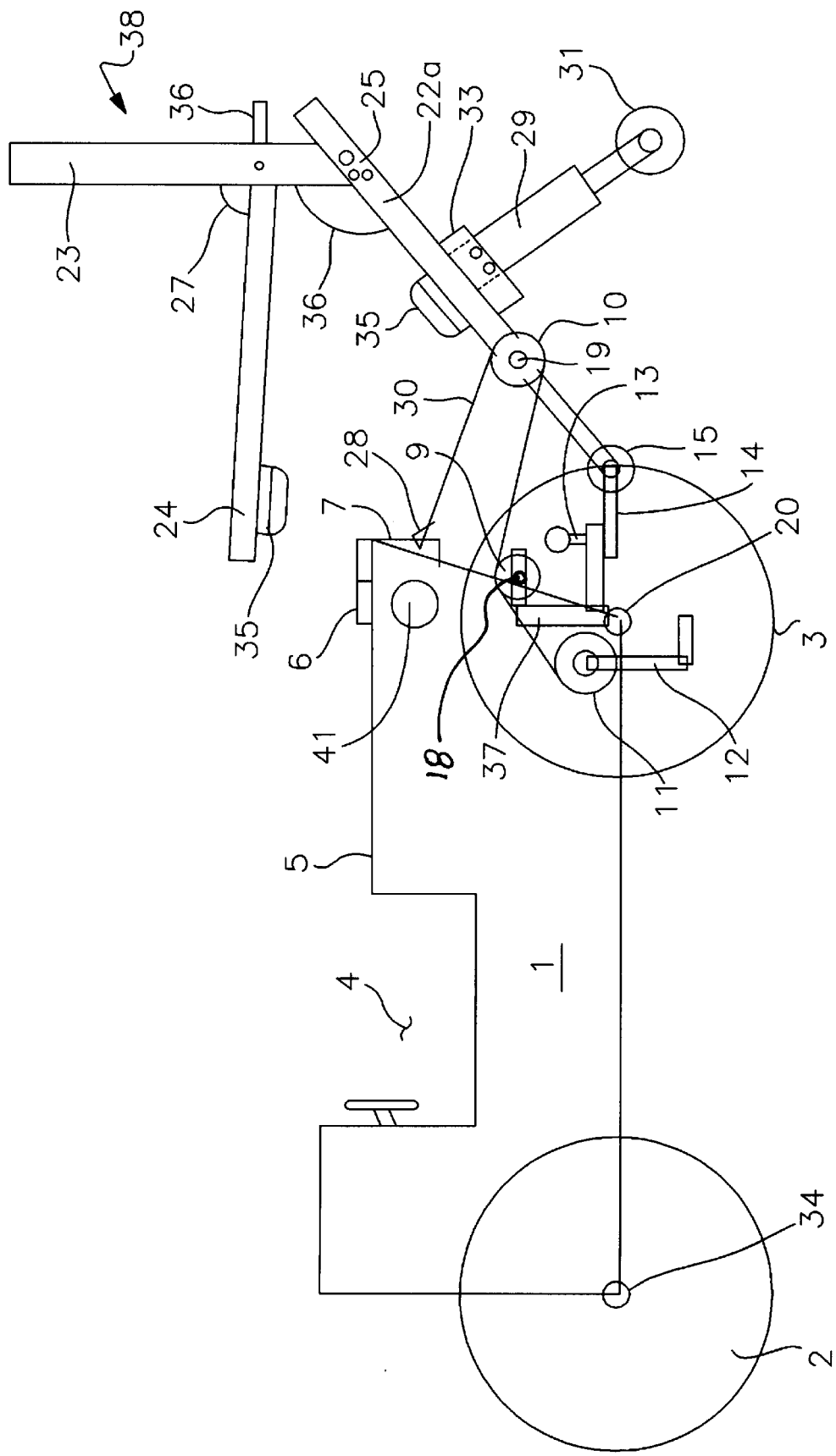
FIG. 1 is a line drawing of a side view of an ATV incorporating the device.
Figure 2:
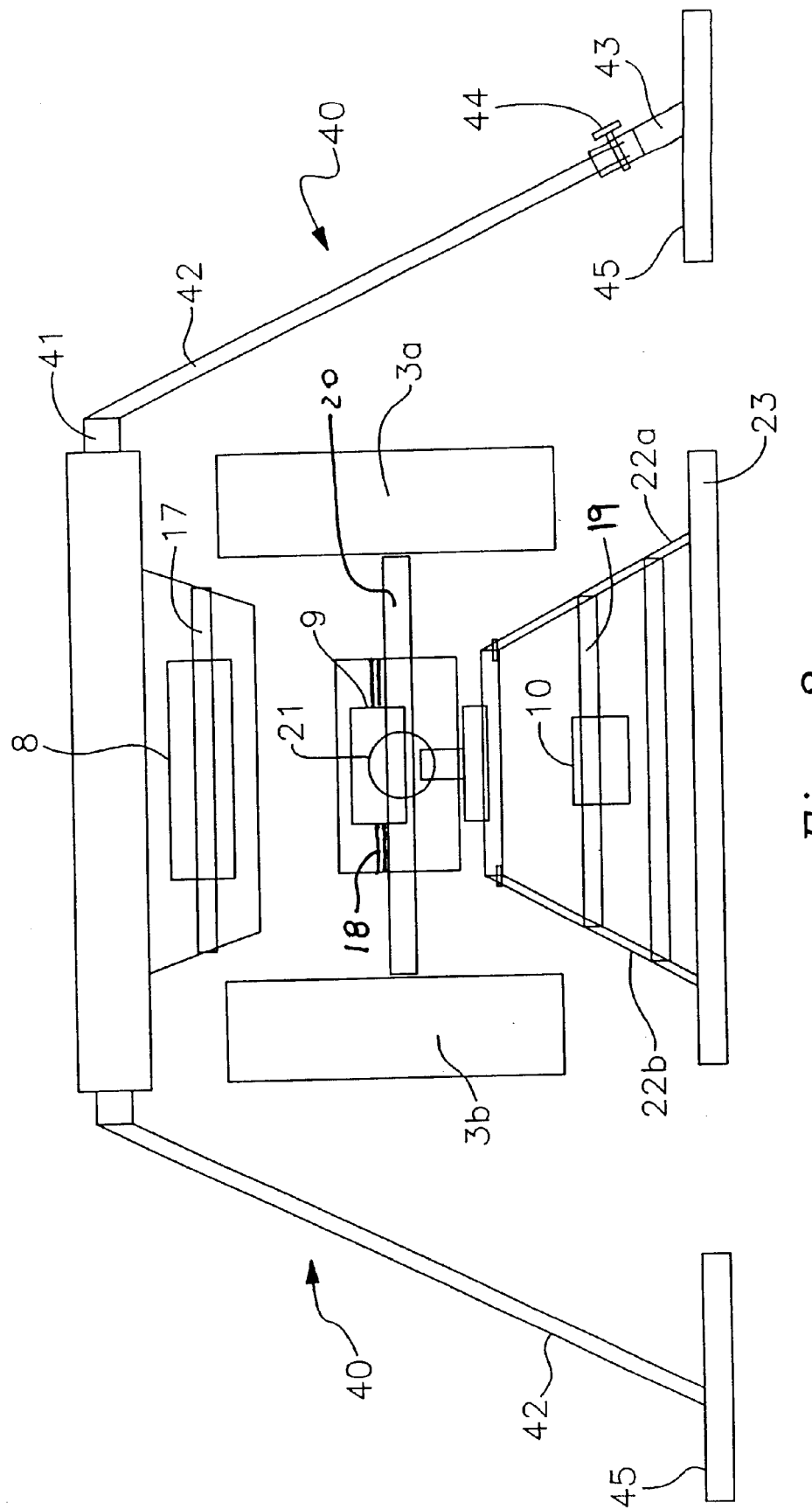
FIG. 2 is a rear view of the device shown in FIG. 1.

As can best be seen by reference to FIGS. 1 and 2 the invention comprises an attachment for an ATV 1 having a front wheel 2 and a rear wheel 3 and a passenger compartment 4 and usually having a rear luggage platform 5 which may have a rail 6 around the top.

Typically a bracket 7 is in place which serves to secure various items and serve as a receiver for a strap 30 in the present invention. In the embodiment shown in FIG. 2 from the rear of the invention there may be a first roller 8 which is attached by way of an axle 17 at the level of the bracket 7. In the embodiment shown in FIG. 2, there is a bracket 7 which serves as a support for the axle 17. The first roller 8 may be used to allow an emergency release or control the slack in the strap 30.

The attachment shown in FIG. 2 would allow that the wheel 8 is a second winch reel so that the device may be winched up from the top instead of from the bottom.

In the preferred embodiment, shown in FIG. 1, this first roller is not used. The strap 30 is attached at the top of the strap directly to the bracket 7. In both embodiments there is a second roller 9 is located behind and slightly above the main ATV axle 20 here on a second axle 18 which is preferably mounted on a special axle plate 37 attached to the frame of the ATV 1. There is a third axle 19 having a third roller 10 which is mounted onto the lifting platform which is comprised of a left lift arm 22a and a right lift arm 22b. The lift arms 22a and 22b pivot on an extension support bar 14 which is attached below a trailer hitch 13 which may be a standard part of a ATV or the extension plate 14 may be attached to the frame of the ATV at some other location as long as a sufficient amount of support is available.

The attachment between the lift 38 and the ATV frame on which the extension 14 is mounted is by way of a swivel 15 (shown also in FIG. 3) so that the lift may move upward and downward on the swivel to raise and lower the lift plate floor 23 as described in more detail below.

The final wheel is a winch 11 having a winch crank 12 which may be attached to the frame of the ATV 1.

An axle plate 37 serves to support the second roller 9 above the axle at the desire height.

A winch strap 30 running from the winch 11 to a tie down point, here bracket 7 over the rollers 9 and 10 allows the user to raise and lower the lift and lift plate floor 23 in a manner described in more detail below.

The strap 30 is permanently attached, here, to a rear ATV bracket 7 and thence runs around third roller 10 mounted on axle 19 and thence to second roller 9 which is on an axle 18 and finally to the reel of the winch 11 which, here, is powered by turning a hand crank 12. As the length of the strap 30 decreases as it is wound about the winch 11, the lift arms 22 are pulled to the ATV and the lift 38, comprised of the lift arms 22 and the lift plate lift arms 22 and lift plate floor 23 is lowered as the length of the strap 30 increases as it is unwound from the winch 11.

As shown in FIG. 1, in order to provide additional support, an auxiliary support leg 29 may be attachable to the lift 38 by way of an auxiliary support attachment 33 may have an auxiliary support leg extension 29 which may have one or more support leg wheels 31. This support may prevent the ATV from tipping over backward under a heavy load and may or may not require the wheel 31 to be in constant contact with the ground. It also allows the lift 38 to function as a cart.

This support leg 29 may be designed to extend further out as the load is lifted in response to the movement of the crank 12 as an additional safety feature.

One or more padded stops 35 may be provided which prevents the lift 38 from hitting the rear of the ATV 1 with too much force.

The platform may be flexible at the point where it attaches to the lifting mechanism or where the floor 23 attaches to the arms 22 so that the floor lies flat on the ground. Once a load, not shown, is added to the floor 23, the weight may be secured in place and then the crank activated to lift the platform. While a hand crank 12 is shown in FIG. 1, it is obvious that an electric motor or other motor could also be used to power the winch 11.

The angle of the platform tilts the load over the ATV as it is raised. When the securing means holding the load in place is removed it falls onto the ATV platform 5 at the rear of the ATV. FIG. 1 shows where the floor 23 may have a lifting plate 24 which carries or holds the load over (above) the ATV rear luggage rack 5. A pad 35 may be used in order to cushion the lifting plate 24 over the luggage rack 5.

The angle 27 between the plate 24 and floor 23 may be adjustable so that a strap between the plate 24 and floor 23 can hold the load (not shown) between those two surfaces.

Figure 3:
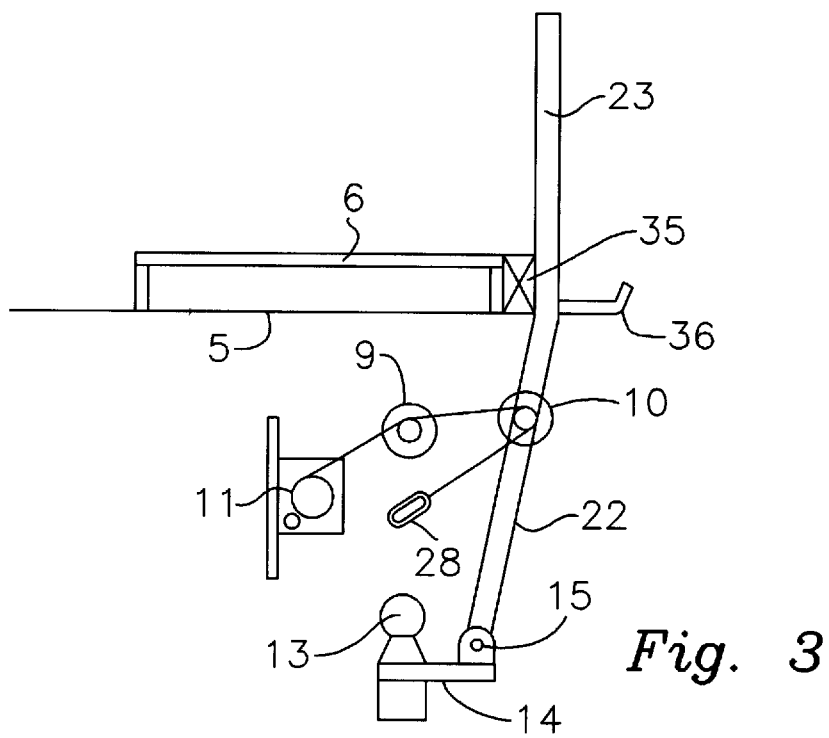
FIG. 3 is an isolated view of the lifting means 38 in the up position.
Figure 4:
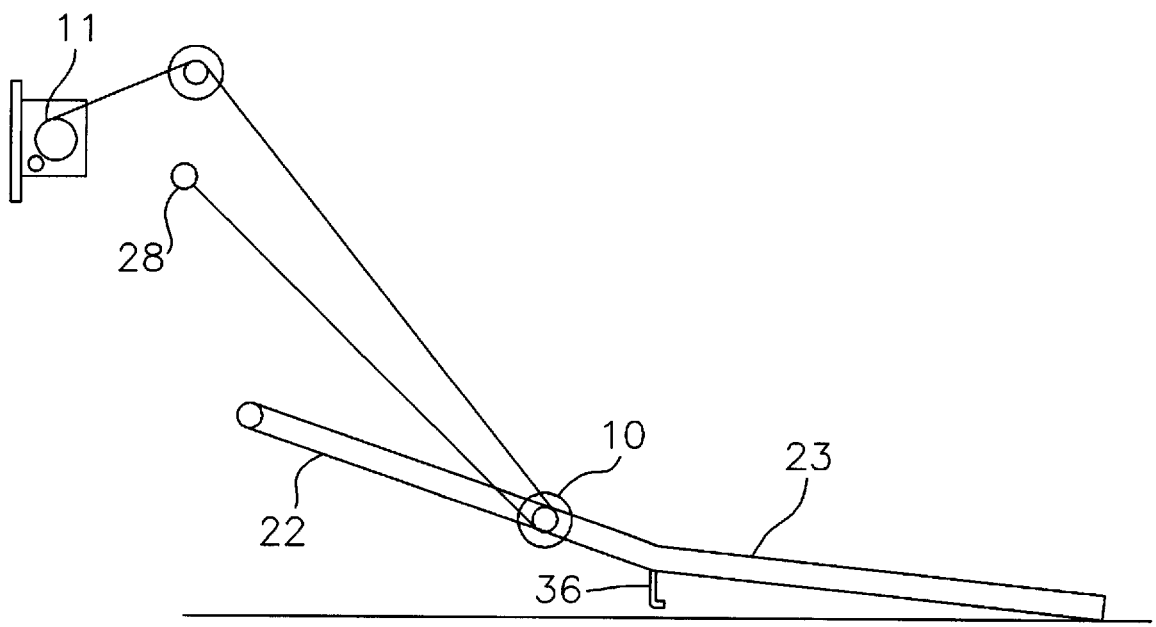
FIG. 4 is an isolated view of the lifting means 38 in the down position.

The strap 30 ends in a clip 28 which fastens to the bracket 7. As shown in FIGS. 3 and 4, the clip 28 may also be designed to attach below the wench 11 by having the winch at a higher location on the ATV 1.

An anti-tipping device 40, as shown in FIG. 2, may be installed. Here, that device is an outrigger comprised of an extension pivot 41 holding a first extension leg 42 which may have a length variable utilizing a second extension leg 43 held by an extending means (here pin 44) which ends in a footing 45. These may be provided to prevent the ATV from tipping when a great deal of weight is applied to the lift 38.

The rear of the lift 38 may, as shown in FIGS. 3 and 4, have a hook 36 to hold additional equipment or a carcass on the ATV. This hook 36 may be located anywhere desirable along the arms 22 or floor 23. Typically, in this design, the extension 14 is 8 inches off of the ground. The other dimensions may be varied in order to change this dimension. The length to the third roller 10 is 18 inches. The arm 22 length is 24 inches. The lift plate floor 23 is also 24 inches in this embodiment. As shown in FIG. 7 there is an 8 inch drop at an angle 36 of approximately 30 degrees between the arm 22 and the floor 23 to allow the lift plate floor 23 to lie flat on the ground when the lift 38 is lowered.

Figure 9:
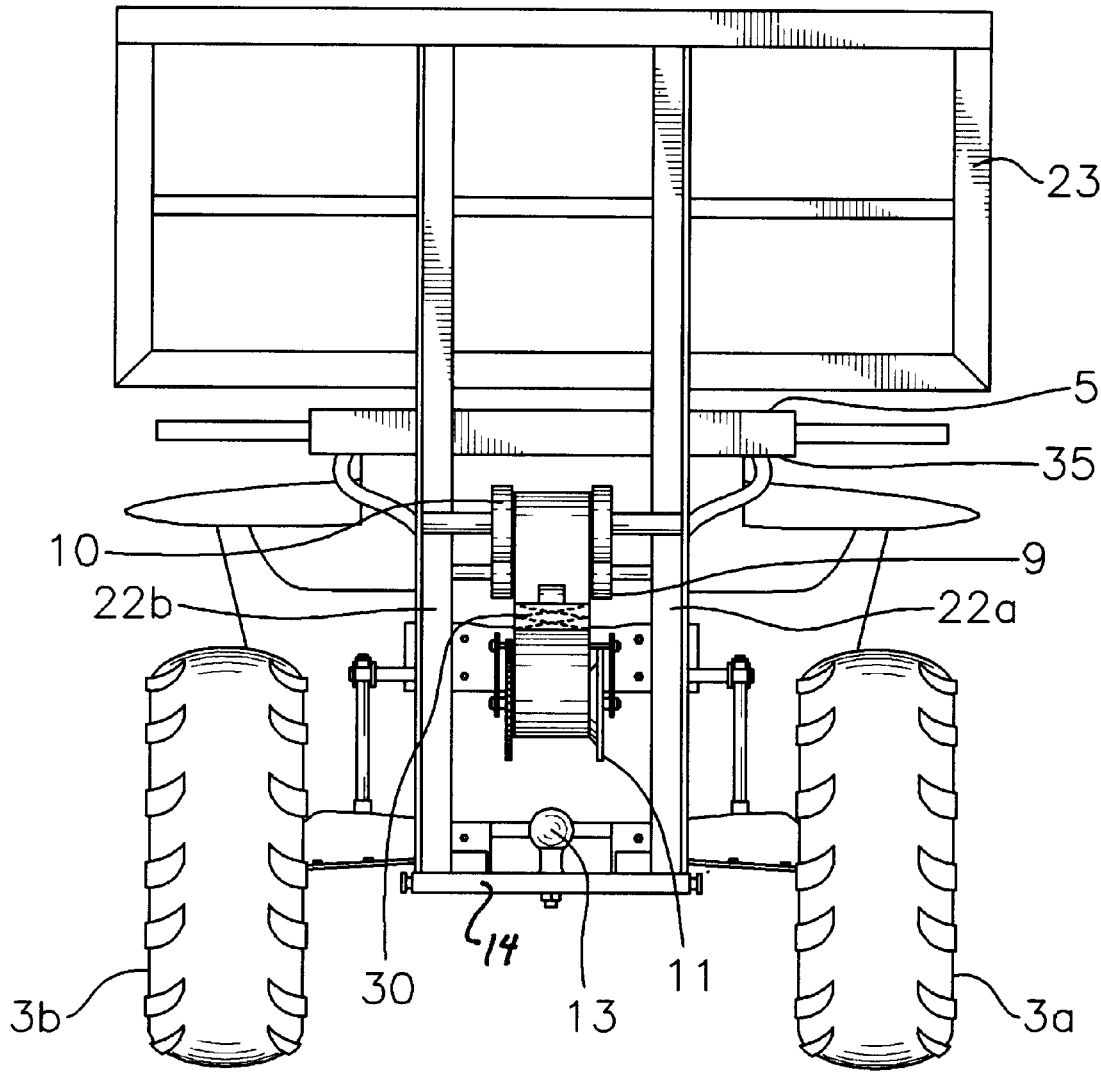
FIG. 9 is a line drawing of a back view of an ATV incorporating the device.

As shown in FIGS. 5 and 9, the two arms 22a and 22b fit pivotally on either side of the hitch ball 13 so that the hitch ball 13 may be used when the device is in place in the raised position. The reduced width between the two arms 22a and 22b allows that the arms 22a and 22b fit between the left wheel 3b and right wheel 3a. The length of the arms 22a and 22b is sufficient so that the floor 23 is beyond the wheels 3a and 3b when the device is being lowered or raised.

The wheel 31 is shown at a long distance from the arms, but may easily be next to the arms or may even be mounted close to the floor so that the platform floor, when lowered to the ground, would roll along the ground.

The arms 22 in the preferred embodiment are between the wheels. However, in alternate embodiments, the two arms could extend from the ATV frame on either side of the wheels to a similar effect. In the preferred embodiment, the arms are used to extend the wider platform floor beyond the wheels.

As shown in FIG. 2 the outriggers 40 may have footings 45 to make them more secure.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

What is claimed is:

1. A lifting device for lifting a load having a length and a width, said device attachable to a vehicle having a frame with a front and a rear said rear having a top, a bottom, and said rear having an attachment means for attaching a lifting platform between the rear top and the rear bottom, said frame further comprising a rear luggage platform having a length and a width capable of supporting the load, said platform extending from the frame rear towards the frame front and said vehicle further comprising wheels located at least partially below the rear luggage platform, said wheels supporting said frame above the ground, and said vehicle further defining a seat between the rear luggage platform and the frame front comprising:

a) a lifting platform having an attachment end and an angle end and wherein the attachment end has a length and wherein the attachment end is pivotally connected to the frame attachment means and wherein the length of the platform attachment end is at least equal to the distance between the frame attachment means and the rear top, said platform further comprising a floor having a front, a rear, a top, a bottom, a length and a width, said floor having a floor end attached to the angle end, and wherein the floor further comprises a lifting plate attached to the floor top between the floor front and the floor rear.

2. The invention of claim 1 wherein the floor further comprises at least two arms with at least one axle running between the arms so that the load may be held over the at least one axle and between theat least two arms while the platform lifted.

3. The invention of claim 1 wherein the plate floor is above and approximately parallel to the rear luggage platform when the platform plate is pivoted upward so that the plate may hold the load over the vehicle rear luggage platform when the floor is raised.

4. A lifting device for lifting a load having a length and a width, said device attachable to a vehicle having a frame, said frame having a front and a rear, said rear having a top and a bottom and said rear further having an attachment means for attaching a lifting platform between the rear top and the rear bottom, and a rear luggage platform having a length and a width extending from the rear top towards the frame front, said vehicle further comprising wheels located at least partially below the rear luggage platform, said wheels holding said frame above the ground, and said vehicle further defining a seat between the luggage platform and the frame front comprising:

a) a lifting platform having an attachment end and an angle end and wherein the attachment end is pivotally connected to the frame attachment means and wherein the length of the platform attachment end is at least equal to the distance between the frame attachment means and the rear top and further comprising a floor having a top and a bottom, a length and a width, said floor connected to the angle end so that when the floor is raised it extends above the rear luggage platform and wherein the frame comprises a left side and a right side and wherein the invention further comprises a first outrigger attached to the left side of the frame and extendable from the frame on the left side to the ground and a second outrigger attached to the right side of frame and extendable from the frame on the right side to the ground.

* * * * *